US011783030B2

(12) United States Patent
Arora et al.

(10) Patent No.: US 11,783,030 B2
(45) Date of Patent: *Oct. 10, 2023

(54) DEFENSE MECHANISM AGAINST COMPONENT-WISE HILL CLIMBING USING SYNTHETIC FACE GENERATORS

(71) Applicant: Visa International Service Association, San Francisco, CA (US)

(72) Inventors: Sunpreet Arora, San Jose, CA (US); Kim Wagner, Sunnyvale, CA (US); Saman Sarraf, Belmont, CA (US)

(73) Assignee: Visa International Service Association, San Francisco, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 17/524,389

(22) Filed: Nov. 11, 2021

(65) Prior Publication Data
US 2022/0067151 A1    Mar. 3, 2022

Related U.S. Application Data

(63) Continuation of application No. 16/356,989, filed on Mar. 18, 2019, now Pat. No. 11,200,313.

(51) Int. Cl.
*G06F 21/55* (2013.01)
*G06F 21/32* (2013.01)
*G06V 40/16* (2022.01)

(52) U.S. Cl.
CPC ............ *G06F 21/552* (2013.01); *G06F 21/32* (2013.01); *G06F 21/554* (2013.01); *G06V 40/172* (2022.01)

(58) Field of Classification Search
None
See application file for complete search history.

(56) References Cited

U.S. PATENT DOCUMENTS

| 9,350,748 | B1 | 5/2016 | McClintock et al. |
| 10,135,815 | B2 | 11/2018 | LeCun et al. |
| 10,452,813 | B2 | 10/2019 | Sorenson et al. |
| 2004/0164139 | A1 | 8/2004 | Hillhouse |
| 2014/0333415 | A1 | 11/2014 | Kursun |
| 2016/0321415 | A1 | 11/2016 | Leonard |
| 2017/0140212 | A1* | 5/2017 | Lo .................... G06V 40/171 |
| 2017/0279800 | A1* | 9/2017 | Castinado ............... G06F 21/32 |

(Continued)

OTHER PUBLICATIONS

Malik et al., "Min Max Threshold Range (MMTR) based approach in palmprint authentication bysobel code method", Procedia Computer Science, vol. 2, 2010, p. 149-158, (Year: 2010).*

(Continued)

*Primary Examiner* — Piotr Poltorak
(74) *Attorney, Agent, or Firm* — Kilpatrick Townsend & Stockton LLP

(57) ABSTRACT

Described herein are a system and techniques for identifying and preventing certain fraud attacks that may be used to defeat facial recognition systems. In embodiments of the system described herein, biometric data may be segregated into regions, which are then processed separately and in parallel. Likeness scores are determined for each of the separate regions. By tracking individual region likeness scores used in access requests in accordance with embodiments of the disclosure, the system is able to identify potential fraud attacks that cannot be detected using conventional systems.

16 Claims, 8 Drawing Sheets

(56) References Cited

U.S. PATENT DOCUMENTS

| | | | |
|---|---|---|---|
| 2017/0346809 A1 | 11/2017 | Plotnik et al. | |
| 2017/0366568 A1* | 12/2017 | Narasimhan | G06F 17/16 |
| 2018/0012003 A1* | 1/2018 | Asulin | G06F 21/36 |
| 2018/0060648 A1 | 3/2018 | Yoo et al. | |
| 2019/0140833 A1* | 5/2019 | Grajek | G06F 21/32 |
| 2019/0205620 A1* | 7/2019 | Yi | G06N 3/08 |
| 2020/0184053 A1* | 6/2020 | Kursun | G06V 10/764 |
| 2020/0274861 A1 | 8/2020 | Black et al. | |

OTHER PUBLICATIONS

U.S. Appl. No. 16/356,989, Non Final Office Action, dated Apr. 1, 2021, 14 pages.

U.S. Appl. No. 16/356,989, Notice of Allowance, dated Aug. 11, 2021, 5 pages.

\* cited by examiner

DEFENSE MECHANISM AGAINST COMPONENT-WISE HILL CLIMBING USING SYNTHETIC FACE GENERATORS

CROSS REFERENCE TO RELATED APPLICATIONS

This application is a continuation of U.S. patent application Ser. No. 16/356,989 filed on Mar. 18, 2019, the contents of which are incorporated by reference herein in their entirety for all purposes.

BACKGROUND

State of the art facial recognition systems are capable of verifying or establishing the identity of a person given a digital photo or video containing his/her facial image. They are being widely used in a variety of applications from law enforcement and border control to smartphone unlock and payments. Although the accuracy of facial recognition, as a biometric technology, is typically lower than iris or fingerprint recognition, face recognition systems have been widely adopted due to their non-invasive image capture process. Several online entities, including banks and merchants now allow users to log in to an account or make a payment using facial recognition (e.g., via a face login). Albeit convenient, this has left users exposed to new kinds of fraud attacks.

For example, advances in artificial intelligence have enabled procedural generation of realistic-looking facial images using synthetic face generators. Furthermore, it is also possible to synthetically modify individual components of faces (e.g., eyes, nose, etc). These procedurally-generated synthetic face images are often difficult to distinguish from real images of faces. Hence, an attacker who knows what a target user's face looks like may be able to procedurally generate a synthetic facial image and sequentially modify individual components of the face to approximate the target user's face and gain access to the user's account. Alternatively, an attacker that does not know what a target user's face looks like may be able to randomly generate a synthetic face image and present it to the facial recognition system to ascertain the similarity of the generated face to the target user's face. Subsequently, the attacker may be able to modify individual components of the generated face until it successfully matches the target user's face via hill-climbing. This is referred to as component wise hill-climbing attack.

Embodiments of the disclosure address these and other problems, individually and collectively.

SUMMARY

Described herein are a system and techniques for identifying and preventing certain fraud attacks that may be used to defeat facial recognition systems. In embodiments of the system described herein, facial data is broken into regions, which may then be processed separately and in parallel. Likeness scores determined for each of the separate regions may be aggregated to provide an overall likelihood score. However, by tracking individual region data used in access requests in accordance with embodiments of the disclosure, the system is able to identify potential fraud attacks that cannot be detected using conventional systems. Additionally, by processing different regions separately and in parallel, the system may provide a more precise indication of a match without extending the amount of time needed to perform the facial recognition. A number of other advantages of the disclosed system would be recognized by one skilled in the art.

Facial recognition is typically performed on an obtained image in two steps. The first step involves image preprocessing and feature extraction, that includes "facial landmark or keypoint detection" and "face alignment", and the second step involves classifying relationships between the features extracted in the first step. During the feature extraction step, the system may identify facial landmarks (e.g. corners of the eyes, eyebrows, and the mouth, the tip of the nose, etc.) within the image and may indicate a position of the identified features. During the classifying step, the system may identify relationships between the extracted features. For example, the system may determine a ratio of the distances between the various facial landmarks. In some embodiments, the determined ratios may be aggregated to generate a unique code that represents the face. This code, and/or the identified ratios, may then be compared to codes and/or ratios stored in a database with respect to known face constructs. In some embodiments, this comparison may involve determining a likelihood (i.e., a percentage chance) that the face in the image matches facial data stored in relation to an account based on a level of commonality between the two. In some embodiments, a face may be determined to be a match with stored facial data only if the likelihood is determined to be greater than some threshold value (e.g., 93%).

In accordance with at least some embodiments of the system described herein, a biometric sample that includes facial data may be received in an access request. The biometric sample is broken into regions, which are then processed separately in parallel. The system then identifies a similarity score for each of the separate regions with respect to corresponding regions of a known biometric sample. For example, the eyes, nose, forehead, ears, lips, and chin regions of the face may each be analyzed independent of the other regions using facial features extracted from that region. In this example, the system may compare features extracted from an eye region of a biometric sample with a user's known eye to determine a similarity score. In some embodiments, the system may then aggregate the separate similarity scores into a single similarity score for the biometric sample, which may then be provided in a response to the request. However, it should be noted that the generation of a single similarity score may not be needed in some embodiments.

In embodiments of the system described herein, past and current similarity scores may be processed in order to identify and prevent various fraud attacks. In some embodiments, the system may identify trends in which a small number of regions varied in similarity score while the majority of regions did not, multiple occurrences of which may indicate a potential attack. The system may be configured to identify and prevent/discourage these attacks as will be described below.

In some embodiments, the system described herein may be implemented in addition to a biometric authentication system. In other words, the system described herein may be used to identify a potential attack while a separate system is used to perform the authentication itself. For example, the current system may be used to identify a hill-climbing attack in a facial recognition process whereas a conventional system using a holistic approach is used to perform the facial analysis required for authentication. In some embodiments, the system described herein may replace, or otherwise take the place of, a conventional system, in that facial analysis and identification of a potential attack may both be performed by the system described herein. In these embodiments, the system may be configured to provide an overall (e.g., aggregate) likelihood value in a manner similar to that of a system using a holistic approach.

These and other embodiments of the disclosure are described in further detail below.

DETAILED DESCRIPTION

Figure 1:
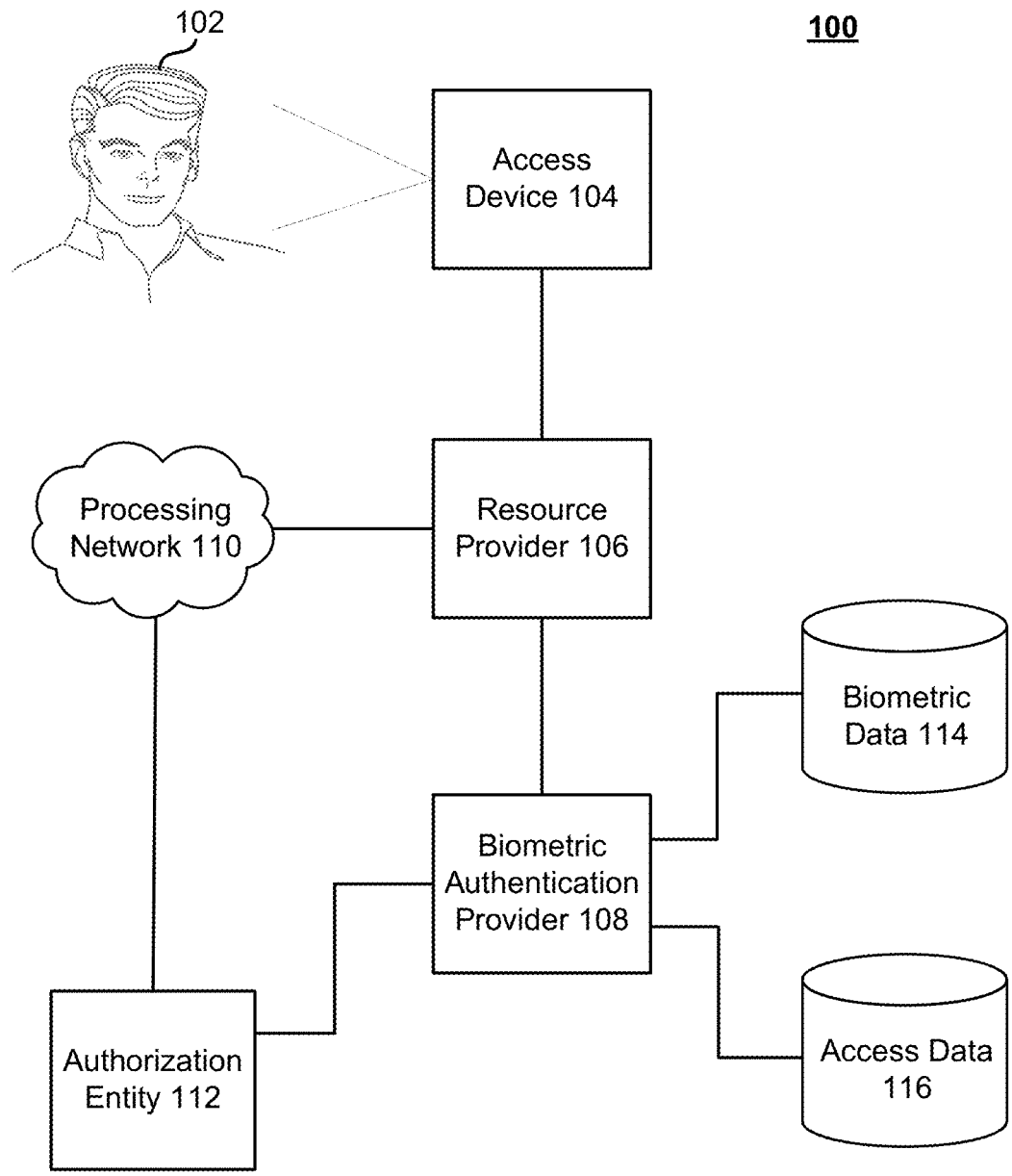
FIG. 1 depicts an overview of a system that may be configured to provide access to an account or resource using biometric authentication while detecting potential fraud attacks in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present disclosure, description of some terms may be helpful in understanding the various embodiments.

An "access request" may include a request for access to a resource. The resource may be physical resources (e.g., goods), digital resources (e.g., electronic document, electronic data, etc.), or services. In some cases, an access request may be submitted by transmission of an access request message that includes access request data. Typically, a device associated with a requestor may transmit the access request message to a device associated with a resource provider.

"Account data" may refer to any content of an account of a user for which an account is maintained. In some embodiments, account data may be payment account data that may be utilized to make a purchase. In other embodiments, account data may be any content associated with a user's non-financial account. For example, account data may include electronic files, photos, videos, and documents stored by the user's account. In some embodiments, account data may be stored by an authorization computer.

"Access request data" may include any suitable information surrounding or related to an access request. Access request data may include information useful for processing and/or verifying the access request. For example, access request data may include details associated with entities (e.g., resource provider computer, processor server computer, authorization computer, etc.) involved in processing the access request, such as entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), resource providing entity data (e.g., resource provider data, document owner data, etc.), user data, date and time of an access request, a method utilized for conducting the access request (e.g., contact, contactless, etc.), and other relevant information. Access request data may also be known as access request information, transaction data, transaction information, or the like.

An "application program interface" or "API" may include software specifying how components of a system should interact. The API may comprise a set of routines, protocols, and tools on which software applications may be built. An API may be used for a web-based system, operating system, database system, computer hardware or software library, and may include specifications for routines, data structures, object classes, variables and/or remote calls.

"Authentication" may include a process for verifying an identity of something (e.g., a user). One form of authentication can be biometric authentication. Facial recognition is a type of biometric authentication that verifies a user's identity by comparing facial features of the user to expected facial features for that user.

An "authorization computer" can include any system involved in authorization of a transaction. The authorization computer may determine whether a transaction can be authorized and may generate an authorization response message including an authorization status (also may be known as an authorization decision). In some embodiments, an authorization computer may be a payment account issuer computer. In some cases, the authorization computer may store contact information of one or more users. In other embodiments, the authorization computer may authorize non-financial transactions involving a user. For example, the authorization computer may make an authorization decision regarding whether the user can access a certain resource (e.g., an electronic document). In some cases, the authorization may be a content provider server computer associated with a content providing entity, which manages one or more resources that may be accessed by the user.

A "biometric" may be any human characteristic that is unique to an individual. For example, a biometric may be a person's fingerprint, voice sample, face, DNA, retina, etc.

A "biometric reader" may include a device for capturing data from an individual's biometric sample. Examples of biometric readers may include fingerprint readers, front-facing cameras, depth sensors, microphones, and iris scanners.

A "biometric sample" may include data obtained by a biometric reader. The data may be either an analog or digital representation of the user's biometric information, generated prior to determining distinct features needed for matching. For example, a biometric sample of a user's face may be image data which portrays the user's face. In another example, a biometric sample of a user's voice may be audio data.

A "biometric template" or "biometric sample template" may include to a file containing distinct characteristics extracted from a biometric sample that may be used during a biometric authentication process. For example, a biometric template may be a binary mathematical file representing the unique features of an individual's fingerprint, eye, hand or voice needed for performing accurate authentication of the individual.

A "computing device" may be any suitable electronic device that can process and communicate information to other electronic devices. The computing device may include a processor and a computer readable medium coupled to the processor, the computer readable medium comprising code, executable by the processor. The computing device may also each include an external communication interface for communicating with each other and other entities. A mobile device may be a type of computing device.

A "depth sensor," or range camera, may be any input sensor device configured to identify a distance or range of an object or objects from the depth sensor. In some embodiments, the depth sensor may generate a range image, in which pixel values correspond to the detected distance for that pixel. The pixel values can be obtained directly in physical units (e.g., meters). In at least some embodiments of the disclosure, a depth sensor may operate using structured light. In a depth sensor that operates using structured light, a projector projects light onto an object or objects in a structured pattern. The light may be of a wavelength that is outside of the visible range (e.g., infrared or ultraviolet). The depth sensor may be equipped with one or more camera devices configured to obtain an image of the object with the reflected pattern. Distance information may then be generated based on distortions in the detected pattern. Embodiments of the disclosure that use depth sensors may involve any suitable type of depth sensor, including those that operate using stereo triangulation, sheet of light triangulation, time-of-flight, interferometry, coded aperture, or any other suitable technique for range detection. One or more depth sensors may be used to collect facial data to be used by a facial recognition system.

A "region" may include a predetermined portion of a biometric sample. In some embodiments, a region may include a specific portion of the biometric sample which does not vary across biometric samples. In some embodiments, a region may be bounded by particular features in the biometric sample such that the region may vary across biometric samples. For example, in a biometric sample that includes facial image data, a region may be bounded by specific facial features which may vary in position in each biometric sample.

A "resource provider" may be an entity that manages access to one or more resources. Examples of resource providers may include merchants, vendors, suppliers, owners, traders, and the like. In some embodiments, such entities may be a single individual, small groups of individuals, or larger groups of individuals (e.g., companies). Resource providers may be associated with one or more physical locations (e.g., supermarkets, malls, stores, etc.) and online platforms (e.g., mobile applications, e-commerce websites, online companies, etc.). In some embodiments, resource providers may make available physical items (e.g., goods, products, etc.) to the user. In other embodiments, resource providers may make available digital resources (e.g., electronic documents, electronic files, etc.) to the user. In other embodiments, resource providers may manage access to an account which that resource provider maintains.

A "server computer" may typically be a powerful computer or cluster of computers. For example, the server computer can be a large mainframe, a minicomputer cluster, or a group of servers functioning as a unit. In one example, a server computer may be a database server coupled to a Web server. The server computer may be associated with an entity such as a merchant, payment processing network, a wallet provider, a merchant, an authentication cloud, an acquirer, or an issuer.

Details of some embodiments of the present disclosure will now be described in greater detail.

FIG. 1 depicts an overview of a system that may be configured to provide access to an account or resource using biometric authentication while detecting potential fraud attacks in accordance with at least some embodiments. In the system 100 depicted in FIG. 1, a user 102 may attempt to gain access to an account or resource using biometric authentication. A biometric sample (e.g., an image of the user's face) may be obtained via an access device 104. The access device 104 may be in communication with a resource provider 106, which may communicate the obtained biometric sample to an biometric authentication provider 108. The biometric authentication provider may be configured to verify an authenticity of the user based on the received biometric sample. In some embodiments, the resource provider 106 may be in communication with a processing network 110, which may be configured to route authorization request messages to one or more authorization entities 112. In some embodiments, the authorization entities 112 may be in communication with the biometric authentication provider 108.

The access device 104 may be any suitable device capable of obtaining biometric sample and enabling access to a resource. In some embodiments, the access device 104 may be a user device such as a mobile phone or laptop owned and/or operated by the user 102. The access device may have one or more sensor devices (e.g., cameras) capable of collecting a biometric sample. In some embodiments, the access device 104 may be owned and/or operated by the same entity as the resource provider 106. For example, the access device 104 may be a camera communicatively coupled to a merchant point-of-sale (POS) device.

The resource provider 106 may be any suitable entity capable of managing access to one or more resources. In some embodiments, the resource provider may manage access to an account (e.g., an online account or payment account). In some embodiments, the resource provider 106 may be a merchant which provides access to various products (goods and/or services). For example, a resource provider 106 may be an online retailer which sells products available from an electronic catalog. In some embodiments, the resource provider 106 may maintain, and provide back-end support for, a mobile application that may be installed on, and executed from, the access device 104.

The biometric authentication provider 108 may be any computing device capable of receiving a biometric sample and determining a likelihood of that biometric sample matching a user. In some embodiments, the biometric authentication provider 108 may be configured to receive a biometric sample from a resource provider 106. In some embodiments, the biometric authentication provider 108 may be configured to receive a biometric sample from an authorization entity 112. In some embodiments, the biometric authentication provider 108 may make available a software development kit (SDK) which allows for the creation of applications that use capabilities provided by the biometric authentication provider 108. For example, the biometric authentication provider 108 may make available an SDK that can be used by the resource provider 106 to develop an application that uses the functionality provided by the biometric authentication provider 108. In some embodiments, the biometric authentication provider 108 may, in response to receiving a request that includes a biometric sample, provide a likelihood value that the biometric sample is a match to one or more users. In some embodiments, the likelihood value may be expressed as a percentage.

The biometric authentication provider 108 may be configured to provide authentication of a user by comparing features extracted from a biometric sample to expected values stored in relation to that user in biometric data 114. In some embodiments, the biometric information stored in biometric data 114 may be stored in multiple parts (e.g., as separate regions). In some embodiments, the biometric authentication provider 108 may maintain information related to previous access requests in access data 116. In some embodiments, the biometric authentication provider 108 may identify an attacker (e.g., a "fake" resource provider or access device) which is providing a procedurally-generated biometric sample based on trends identified in the access data 116.

The processing network 110 may be any network or combination of networks configured to receive authorization request messages and to route those received authorization request messages to an appropriate authorization entity. In some embodiments, the processing network may be a transaction processing network that typically routes payment transactions to an appropriate issuer (e.g., VisaNet).

The authorization computer 112 may be a computing device operated on behalf of any entity capable of providing authorization for a transaction. In some embodiments, the authorization computer 112 may be operated on behalf of an entity that manages a payment account and bears responsibility for financial transactions conducted using that account. In some embodiments, the authorization computer 112 may be operated by a banking institution, wallet application, or token provider.

In order to illustrate an example of potential interactions between the various components depicted in FIG. 1, consider a scenario in which a biometric authentication provider 108 makes public an SDK to be used in obtaining biometric authentication services. In this illustrative example, a resource provider (or somebody posing as a resource provider) may develop an application capable of interfacing with the biometric authentication provider 108 via the SDK. The resource provider may then submit a request for biometric authentication of a user via the application. For the purposes of this example, consider a scenario in which the biometric authentication provider 108 is unable to determine whether the biometric sample is real or has been procedurally generated. In this scenario, the biometric authentication provider 108 might perform the authentication and provide the resource provider with a response. Since the resource provider 106 would typically bear the risk in a transaction (declined transactions may be charged back to the resource provider), the biometric authentication provider 108 may provider a likelihood value that represents the percentage chance that the biometric sample is a match fora user. The resource provider 106, upon receiving this likelihood value, might then determine whether the risk of a charged-back transaction is worth accepting to complete the transaction. In other words, the resource provider 106 may complete a transaction (e.g., grant the user 102 access to a resource) only if the likelihood value is greater than some predetermined threshold.

However, in the example above, the resource provider 106 (or the access device 104) may not be a real resource provider, and instead may be an attacker. If this is the case, then the resource provider 106 may submit a procedurally-generated biometric sample (e.g., an image of a user generated by a computer) to the biometric authentication provider 108 and may receive an indication of a likelihood value for that biometric sample. The attacker may then alter one feature in the biometric sample and re-submit it to the biometric authentication provider 108. The biometric authentication provider 108 may then respond with a new likelihood value that the attacker can use to determine whether the new biometric sample is a better or worse match for a particular user. By doing this multiple times, the attacker can generate a biometric sample for which a match is greater than a threshold value needed to gain access to a resource from another resource provider 106. The attacker may then use the generated biometric sample to gain access to other accounts maintained by the user and/or may sell the generated biometric sample.

To reduce the risk of the above attack, the biometric authentication provider 108 described herein may be configured to identify such potential attacks. In some embodiments, this may involve separately analyzing individual regions within a biometric sample using separate applications (e.g., artificial intelligence training models) specific to those regions. This may also allow for greater accuracy while being capable of providing the results within a shortened time span (by processing the separate regions in parallel). In order to identify potential attacks like the one described above, the system may identify patterns in previous access requests. For example the system may identify a number of access requests in which the majority of features remained constant and a small number of features were varied across the multiple attempts. This may indicate an attack like the one described above. Once identified, the system may take preventative actions as described below.

It should be noted the biometric authentication provider 108 may reduce the risk of these fraud attacks by simply limiting access to its biometric authentication functionality to trusted entities. However, this would negatively impact the marketability of the service provided by the biometric authentication provider 108 while depriving small resource providers 106 of the capabilities described herein. Therefore, the ability to identify and prevent these attacks as described in the current system may provide multiple advantages over such systems that merely restrict access.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the internet), using any suitable communication protocol.

Figure 2:
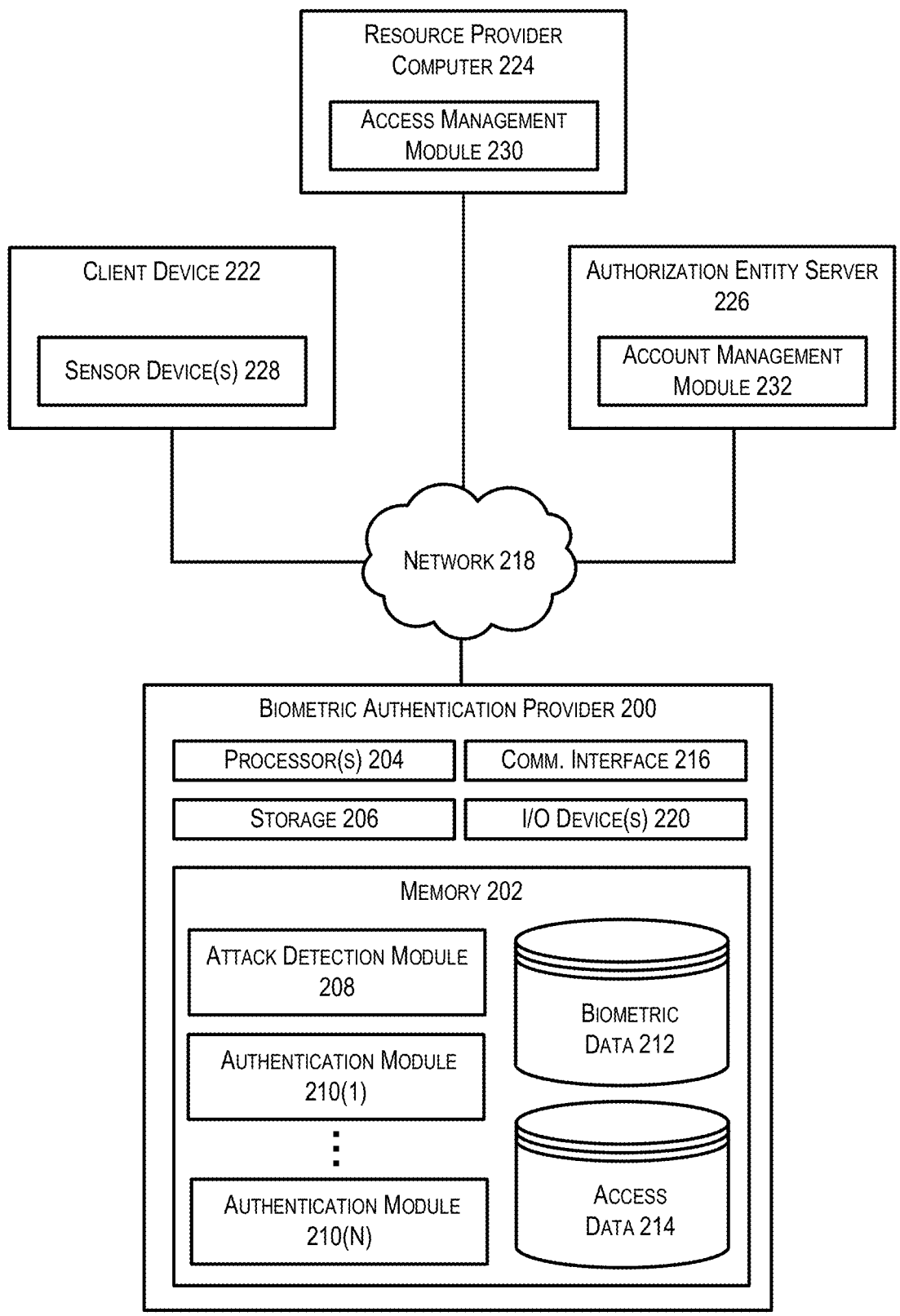
FIG. 2 depicts a diagram of an exemplary biometric authentication provider that may be configured to detect various types of fraud attacks in accordance with at least some embodiments.

FIG. 2 depicts a diagram of an exemplary biometric authentication provider 200 that may be configured to detect various types of fraud attacks in accordance with at least some embodiments. The biometric authentication provider 200 may be an example biometric authentication provider 108 described with respect to FIG. 1 above.

The biometric authentication provider 200 may be any type of computing device capable of performing biometric authentication as well as detecting potential fraud attacks as described herein. In at least some embodiments, the biometric authentication provider 200 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of biometric authentication provider 200, the memory 202 may be volatile (such as random access memory (RAM)) and/or non-volatile (such as read-only memory (ROM), flash memory, etc.). The biometric authentication provider 200 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the biometric authentication provider 200. In some embodiments, the memory 202 may include multiple different types of memory, such as static random access memory (SRAM), dynamic random access memory (DRAM) or ROM.

Turning to the contents of the memory 202 in more detail, the memory 202 may include an operating system and one or more application programs or services for implementing the features disclosed herein including at least a module for identifying and discouraging fraud attacks (attack detection module 208), and one or more modules for authenticating a portion of a biometric sample (authentication module 210). The memory 202 may also include a number of data stores, including biometric data 212, which maintains biometric samples associated with a user, and/or access data 214, which may include information about access requests made by one or more users as well as historical similarity scores for those access requests.

In some embodiments, the attack detection module 208 may, in conjunction with the processor 204, be configured to identify potential fraud attacks within biometric authentication requests. In some embodiments, this may involve identifying particular patterns in past and current access requests across different portions of a biometric sample. For example, the attack detection module 208 may determine that likelihood values for the majority of portions of a biometric sample have remained unchanged but that likelihood values for a small number of portions of the biometric sample have changed, which may indicate an attack. In some embodiments, the attack detection module 208 may identify past access requests (from either the same or different resource provider 224 and/or client device 228) for which the likelihood values have varied for the same small number of portions of the biometric sample and may detect a potential attack if the variance between access requests is not consistent.

In some embodiments, each authentication module 210 may, in conjunction with the processor 204, be configured to determine a likelihood value to be assigned to a portion of a biometric sample. In some embodiments, an authentication module 210 may calculate a likelihood value by identifying relationships between various features extracted from the biometric sample (e.g., a ratio of distances between the various features) and comparing those relationships to what is expected for the user being verified. In some embodiments, the biometric authentication provider 200 may include a number of authentication modules 210 (1-N), each of which may be configured to authenticate a particular portion of a biometric sample. It should be noted that while each authentication module 210 may focus on a likelihood for a match between a particular portion of the biometric sample, that likelihood may take into account (e.g., the likelihood may be calculated based on) a relationship between one or more features within the particular portion and one or more features within a different portion of the biometric sample. In some embodiments, each of the authentication modules 210 (1-N) may use artificial intelligence. For example, each of the authentication modules 210 may utilize an AI module which has been trained on a different biometric region.

The biometric authentication provider 200 may also contain communications interface(s) 216 that enable the biometric authentication provider 200 to communicate with a stored database, another computing device or server, one or more remote devices, and/or any other suitable electronic devices. In some embodiments, the communication interface 216 may enable the biometric authentication provider 200 to communicate with other electronic devices on a network 218 (e.g., on a private network). The biometric authentication provider 200 may also include input/output (I/O) device(s) and/or ports 220, such as for enabling connection with a keyboard, a mouse, a pen, a voice input device, a touch input device, a display, speakers, a printer, etc.

The biometric authentication provider 200 may be in communication with a client device 222, resource provider computers 224, and/or authorization entity server 226. Each of the client devices 222 may be capable of interacting with the biometric authentication provider 200 or resource provider computer 224 to conduct a transaction and/or access content stored at a memory location. For example, the client devices 222 may include a web browser or other application that enables a user of the client device 222 to access a website maintained by the biometric authentication provider 200 or resource provider computer 224. In some embodiments, the biometric authentication provider 200 may maintain an account with respect to one or more resource provider computers 224 and/or authorization entity servers 206.

The client device 222 may include one or more sensor devices 228 capable of reading a machine-readable code (e.g., a barcode scanner). The sensor devices 228 may include a number of camera devices, one or more of which may be a depth sensor capable of generating a range image, and one or more of which may be a camera configured to capture image information. A depth sensor may include any device configured to obtain information related to a range or distance between an object (i.e., features on a face) and the depth sensor. The depth sensor may be configured to generate a range image or depth map based on received depth information. In some embodiments, a biometric sample may include a range image of a user's face. In some embodiments, a biometric sample may include a digital image of a user's face.

In some embodiments, the client device 222 may include a mobile application, which may be a set of computer executable instructions that, when executed, causes the client device 222 to collect a biometric sample via the sensor devices 228 and attempt to access a resource managed by the resource provider computer 224 using the biometric sample. In some embodiments, the mobile application may be an application which is maintained on behalf of, and supported by, a particular resource provider (e.g., a merchant).

In some embodiments, a resource provider computer 224 may be any computing device capable of providing access to at least one resource to a client device 222. In some embodiments, the resource provider computer 224 may include, in its memory, one or more modules for making a resource accessible to a client device 222 (access management module 232). In some embodiments, the resource provider computer 224 may provide a biometric sample obtained from a client device 222 to the biometric authentication provider 200. In at least some of these embodiments, the resource provider 224 may be provided with a likelihood value that represents a likelihood that the provided biometric sample is a match to a particular user. In some embodiments, the resource provider computer 224 may be further configured to provide access to one or more resources to that it manages to the client device 222 upon determining that the received likelihood value is greater than some threshold value. It should be noted that as the threshold value represents an amount of risk that the resource provider is willing to accept (since it will typically not be able to collect payment for fraudulent transactions), the threshold value may vary by resource provider. In at least some embodiments, the resource provider computer 224 may provide an indication of a payment device (e.g., a credit card number or token) to a biometric authentication provider 200 along with a biometric sample. In these embodiments, the user to which the biometric sample should be compared may be obtained based on the provided payment device.

In some embodiments, the resource provider computer 224 may be in communication with an authorization server 226. For example, the resource provider computer 224 may be configured to generate an authorization request message for a transaction and to provide the generated authorization request message to a processing network (which may be separate from network 218) to be routed to the appropriate authorization server 226.

In some embodiments, an authorization server 226 may be configured to approve or decline a transaction conducted with the resource provider computer 224 via the client device 222. In some embodiments, the authorization server 226 may receive a biometric sample from the authorization server 226 and may approve or decline the transaction based on a likelihood that the biometric sample matches biometric information stored in relation to a particular user or account. In some embodiments, the authorization server 226 may approve or decline the transaction based on factors other than the biometric sample. In other words, the system described herein may simply provide more accurate user authentication for a resource provider computer 224 in order to prevent chargebacks due to fraudulent transactions.

Figure 3:
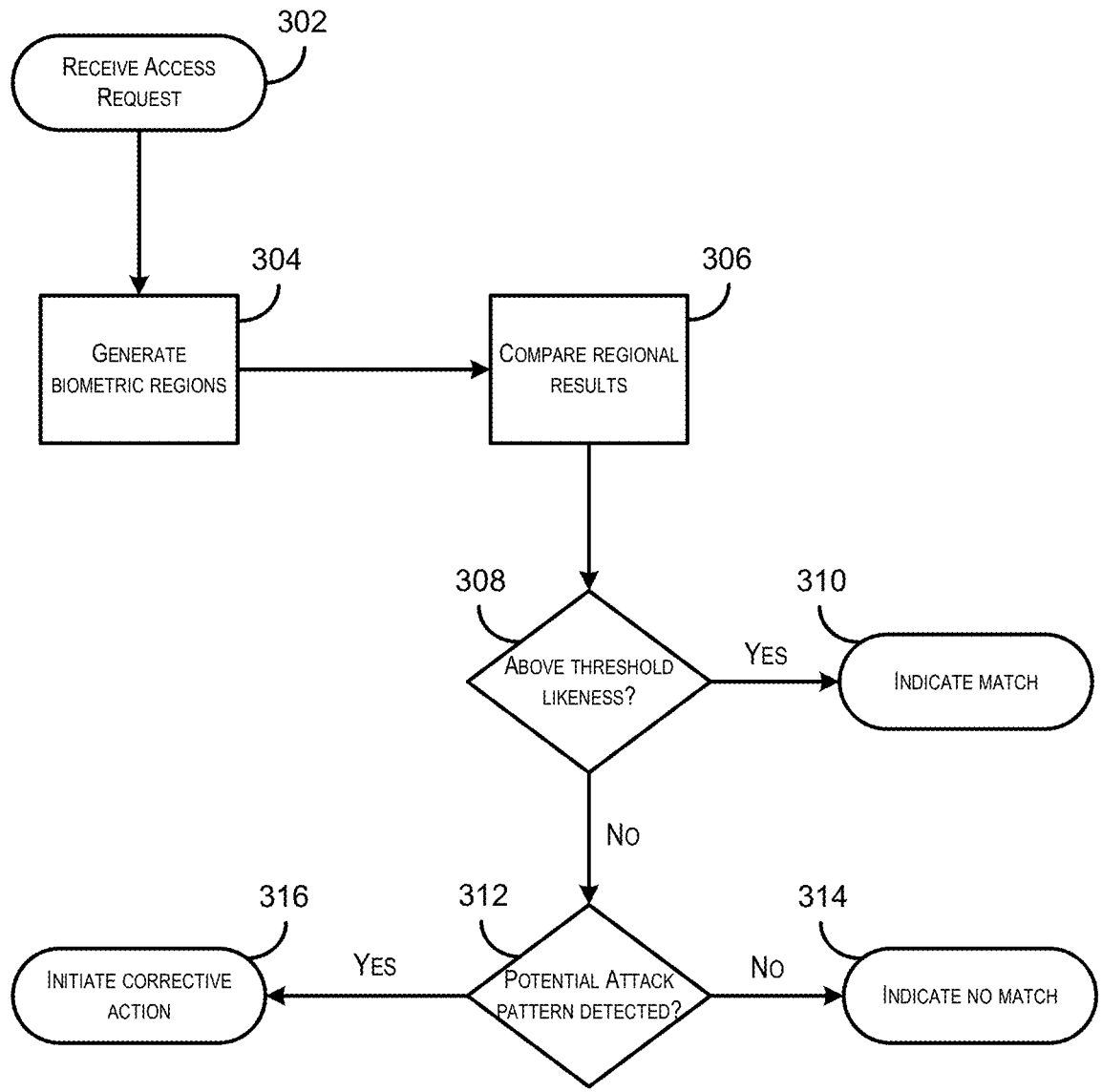
FIG. 3 depicts a flow diagram depicting a process for identifying and preventing a potential fraud attack with an access request in accordance with at least some embodiments.

FIG. 3 depicts a flow diagram depicting a process for identifying and preventing a potential fraud attack with an access request in accordance with at least some embodiments. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 300 (or any other processes described herein, or variations and/or combinations thereof) may be performed under the control of one or more computer systems configured with executable instructions and may be implemented as code (e.g., executable instructions, one or more computer programs or one or more applications). The code may be stored on a computer-readable storage medium, for example, in the form of a computer program including a plurality of instructions executable by one or more processors. The computer-readable storage medium may be non-transitory. In some embodiments, the process 300 may be performed by a biometric authentication provider such as the biometric authentication provider 200 described with respect to FIG. 2.

The process 300 may begin at 302, when an access request is received that involves biometric authentication. In some embodiments, the access request may include a user identifier (e.g., a payment device identifier, account number, or any other suitable identifier that can be used to identify a particular user). Upon receiving the request, the process may involve retrieving biometric information stored for that user. For example, the process may involve retrieving biometric data obtained and stored during an enrollment process. In this example, the user may, upon generating or updating an account, provide such a biometric sample.

At 304, the process 300 may involve generating a number of separate regions from the received biometric sample. The separate regions may then be compared to corresponding regions of biometric information stored for the user at 306. Each of the separate regions may be analyzed by a different authentication module in order to determine a likelihood value for that region (i.e., a percentage match of the region within the biometric sample to the biometric information stored for the user). It should be noted that in some embodiments, the same biometric sample may be provided to each of the authentication modules, which may then determine a likelihood value for its respective region using that biometric sample. The system may then record likelihood values for each of the separate regions within a database that contains access data. In some embodiments, the likelihood values for each of the separate regions may be combined into an aggregate likelihood value for the biometric sample. In some embodiments, this may involve generating an average from the likelihood values. In some embodiments, this may involve assigning a weight to each region (e.g., based on a percentage of the biometric sample that the region comprises) and creating a weighted average from the likelihood values for the regions.

In some embodiments, at 308, the process 300 may involve determining whether an aggregate likelihood that the user is a match is greater than a threshold likeness value. If the aggregate likelihood is determined to be greater than the threshold likeness value, then the process may involve providing an indication that the user is likely a match at 310. The process may or may not involve providing the aggregate likelihood value to the requestor.

If the aggregate likelihood is determined to be greater than the threshold likeness value, then the process 300 may involve determining whether the access request is part of a fraud attack at 312. In some embodiments, this may involve identifying whether a majority of match results for the portions of the biometric sample are similar to prior match results for those portions while the rest of the minority of match results for the portions of the biometric sample are dissimilar to prior match results for those portions. In some embodiments, the system may detect different dissimilarities in past matches for the same minority of portions, which may be an indication of a hill-climbing attack.

At 314, the process 300 may involve returning an indication that the biometric sample does not match the user upon determining that the access request is unlikely to be a fraud attack. In some embodiments, the system may also return the aggregate likelihood determined above.

At 316, the process 300 may involve, upon determining that the access request is likely to be a fraud attack, initiating corrective action. In some embodiments, the system may return an incorrect aggregate likelihood value to the requestor. In some embodiments, the system may decline the access request without providing the aggregate likelihood value to the requestor. In some embodiments, the system may block future access requests that originate from the same client device as the current access request.

Figure 4:
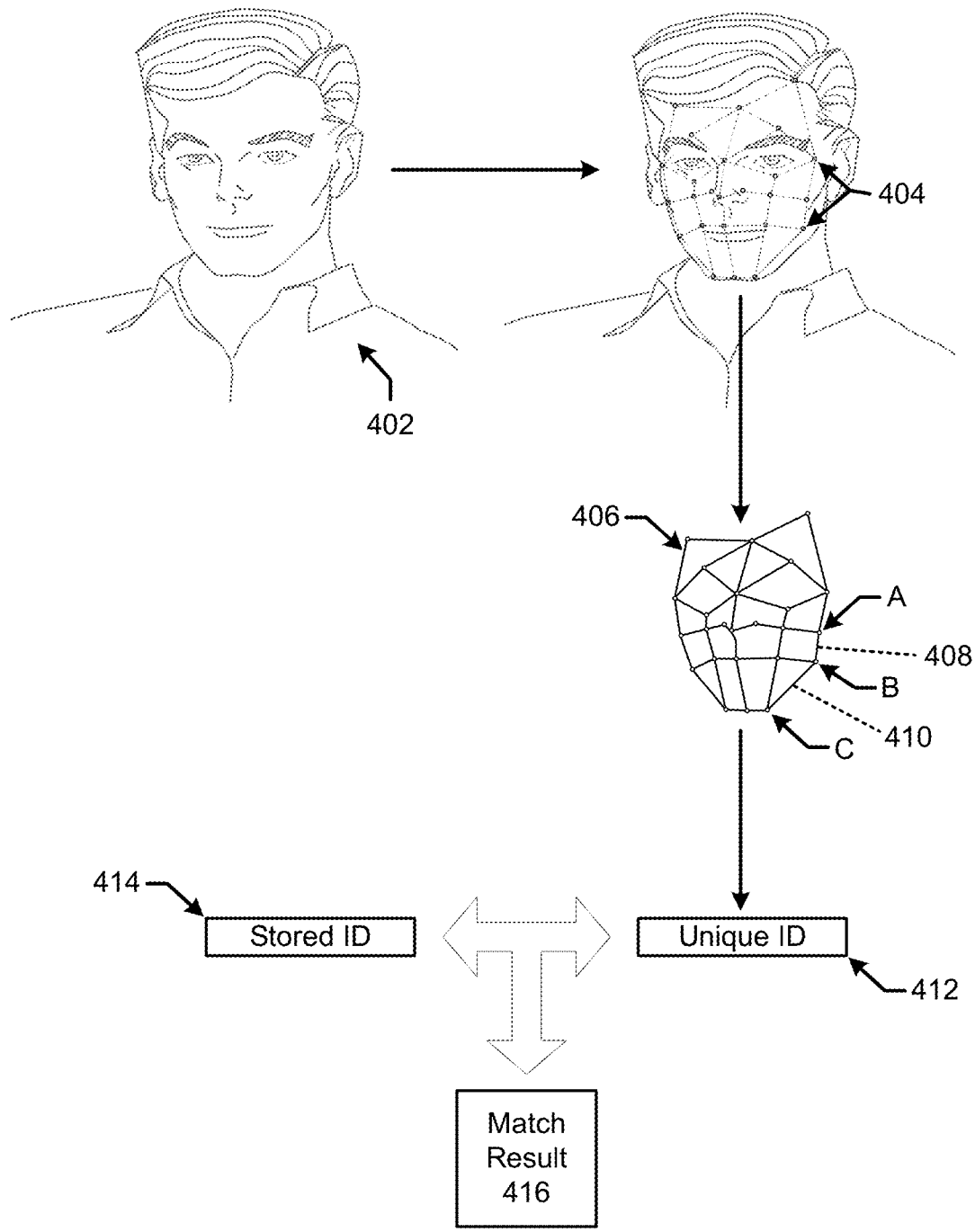
FIG. 4 depicts an illustrative example of a facial recognition process that may be performed during a conventional biometric authentication of a user.

FIG. 4 depicts an illustrative example of a facial recognition process that may be performed during a conventional biometric authentication of a user. In FIG. 4, an image of a user may be submitted as a biometric sample 402 within an access request. In this illustrative example, one or more artificial intelligence modules may be used to identify a number of features (or landmarks) 404 within the image of the user.

In this example, the system may measure distances 406, or vectors (which include direction and distance), between various features 404. These distance measurements may then be compared to other distance measurements in order to identify relationships between the features 404. For example, a distance measurement from point A to point B (AB) 408 may be compared to a distance measurement from point B to point C (BC) 410 in order to determine that AB 408 is proportionally 0.67 times BC 410. In some embodiments, the determined relationships (e.g., relative distances between features) for the biometric sample as a whole may then be aggregated into a unique identifier 412.

Once a unique identifier 412 has been generated for the biometric sample 402, that unique identifier 412 may then be compared to a stored identifier 414 to determine a degree to which the two identifiers match. The stored identifier 414 may be specific to a user and may include an identifier generated in a manner similar to the unique identifier 412 for a user during an enrollment process. The system may then generate a match result 416 that represents a degree to which the two identifiers match (e.g., a likelihood that the two biometric samples were obtained from the same person). In some embodiments, the match result 416 may be represented by a percentage or fractional value.

Figure 5:
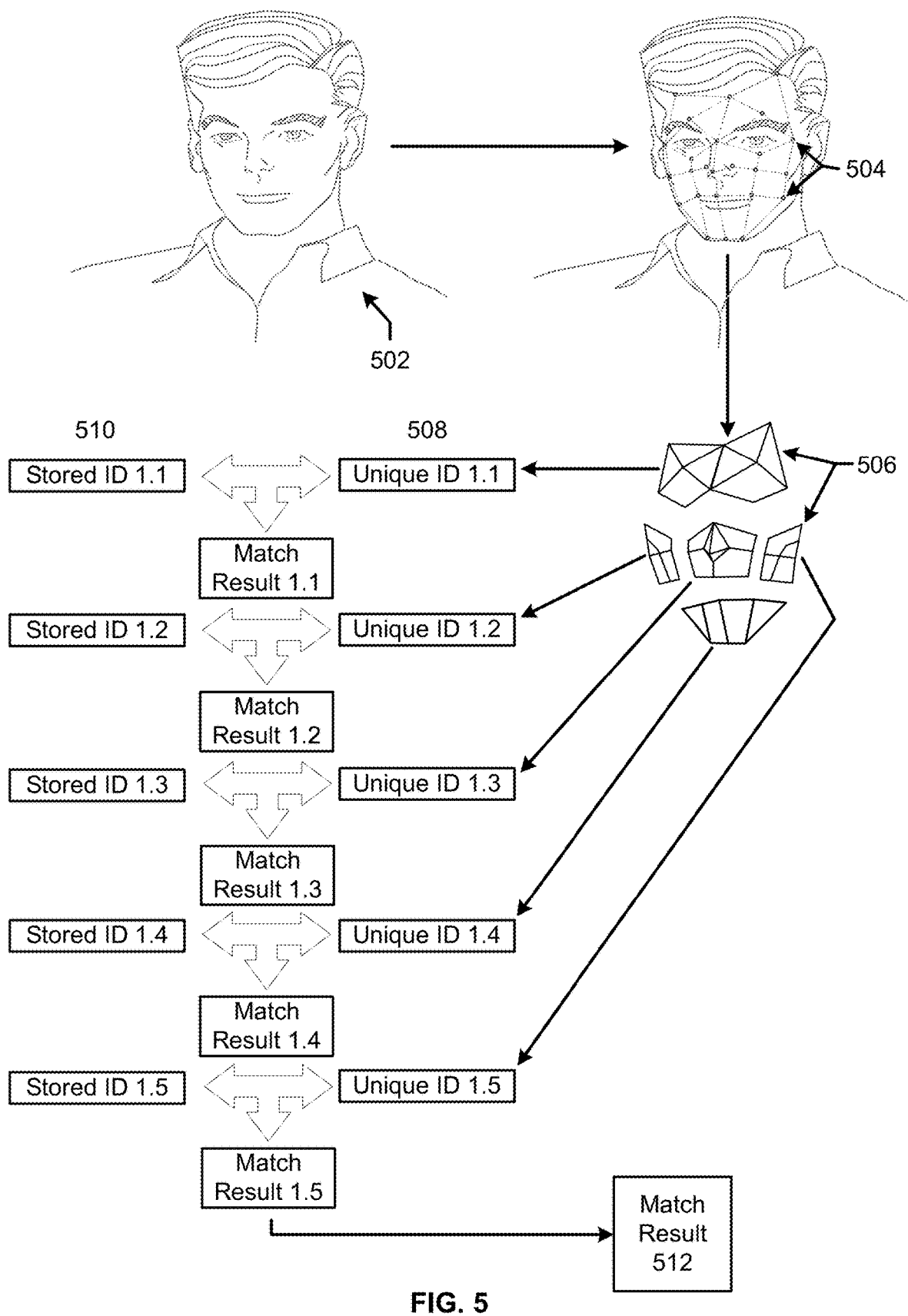
FIG. 5 depicts an illustrative example of a facial recognition process that may be performed during a biometric authentication of a user in accordance with at least some embodiments.

FIG. 5 depicts an illustrative example of a facial recognition process that may be performed during a biometric authentication of a user in accordance with at least some embodiments. In FIG. 5, an image of a user may be submitted as a biometric sample 502 within an access request. In this illustrative example, one or more artificial intelligence modules may be used to identify a number of features (or landmarks) 504 within the image of the user.

In some embodiments, the number of features 504 may be segregated into different regions 506. It should be noted that some features may be included in multiple regions 506. Within those regions, relationships between various features may be identified in a manner similar to that described in FIG. 4 above. However, the system in FIG. 5 may generate separate unique identifiers 508 for each of the separate regions. For example, if the features are broken up into 5 different regions 506 as depicted in FIG. 5, then unique identifiers 508 1.1-1.5 may be generated as shown. Each of the unique identifiers 508 may then be compared to a corresponding stored identifier 510 to determine a degree to which those two identifiers match. Each of the stored identifiers 510 may be generated specific to the same region as the corresponding unique identifier and may have been generated in a manner similar to the corresponding unique identifier 508 for the user during an enrollment process. The system may then generate match results for each of the unique identifiers 508 that represents a degree to which the two identifiers for a particular region match.

In some embodiments, the match results generated for each of the separate regions may be combined or aggregated into a single match result 512 for the biometric sample. In some embodiments, this may involve generating an average for the individual region match results. For example, the system may generate a weighted average wherein each region match result is weighted in accordance with a proportion of the biometric sample that the region comprises. In some embodiments, the match result 512 may be represented by a percentage or fractional value.

Figure 6:
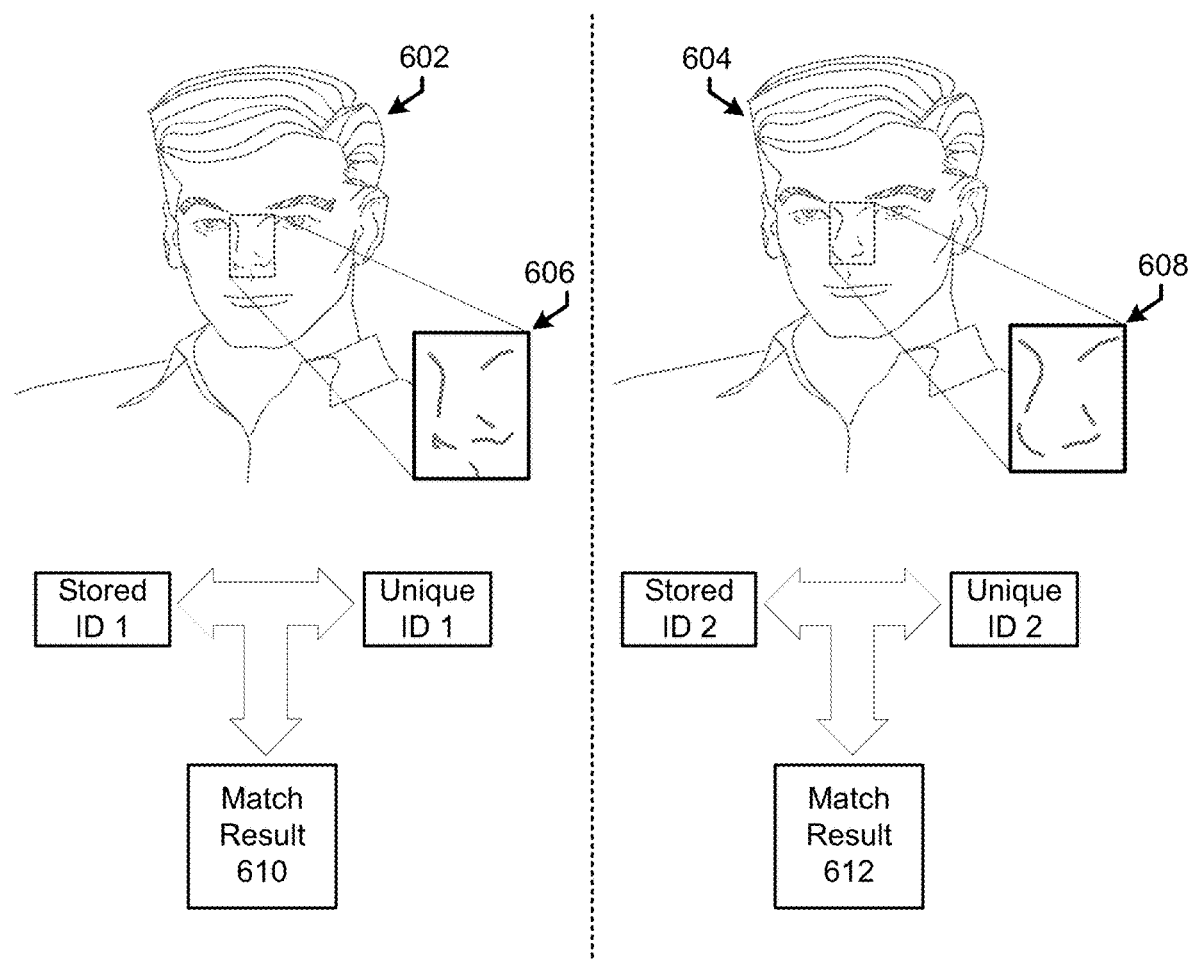
FIG. 6 depicts an illustrative example of a potential fraud attack conducted via an access request on a conventional biometric authentication system.

FIG. 6 depicts an illustrative example of a potential fraud attack conducted via an access request on a conventional biometric authentication system. In FIG. 6, two biometric samples 602 and 604 may be submitted via two separate access requests. In this example, consider that the access requests are conducted as part of a fraud attack in which the biometric samples 602 and 604 have both been procedurally generated. Assume that the attacker has generated the biometric samples as having all similar features with the exception of a small portion of the biometric sample. For example, region 606 of biometric samples 602 may be varied from region 608 of biometric samples 604. The attacker vary individual portions across a number of access requests a number of times in order to obtain a biometric sample which more closely approximates biometric information stored for an actual user.

In FIG. 6, a biometric authentication is performed for each of the biometric samples 602 and 604 in accordance with the process described with respect to FIG. 4 above. Since the system considers the biometric samples as a whole, it may determine holistic match result values for each of the submitted biometric samples. For example, using the process described in FIG. 4, biometric sample 602 may be assigned a match result 610 value of 0.839 (or 83.9%) and biometric sample 604 may be assigned a match result 612 value of 0.851 (or 85.1%). However, it should be noted that since variances such as those between the match results of the biometric samples 602 and 604 can occur naturally, it would be difficult to identify the fraud attack being performed in the scenario depicted.

Figure 7:
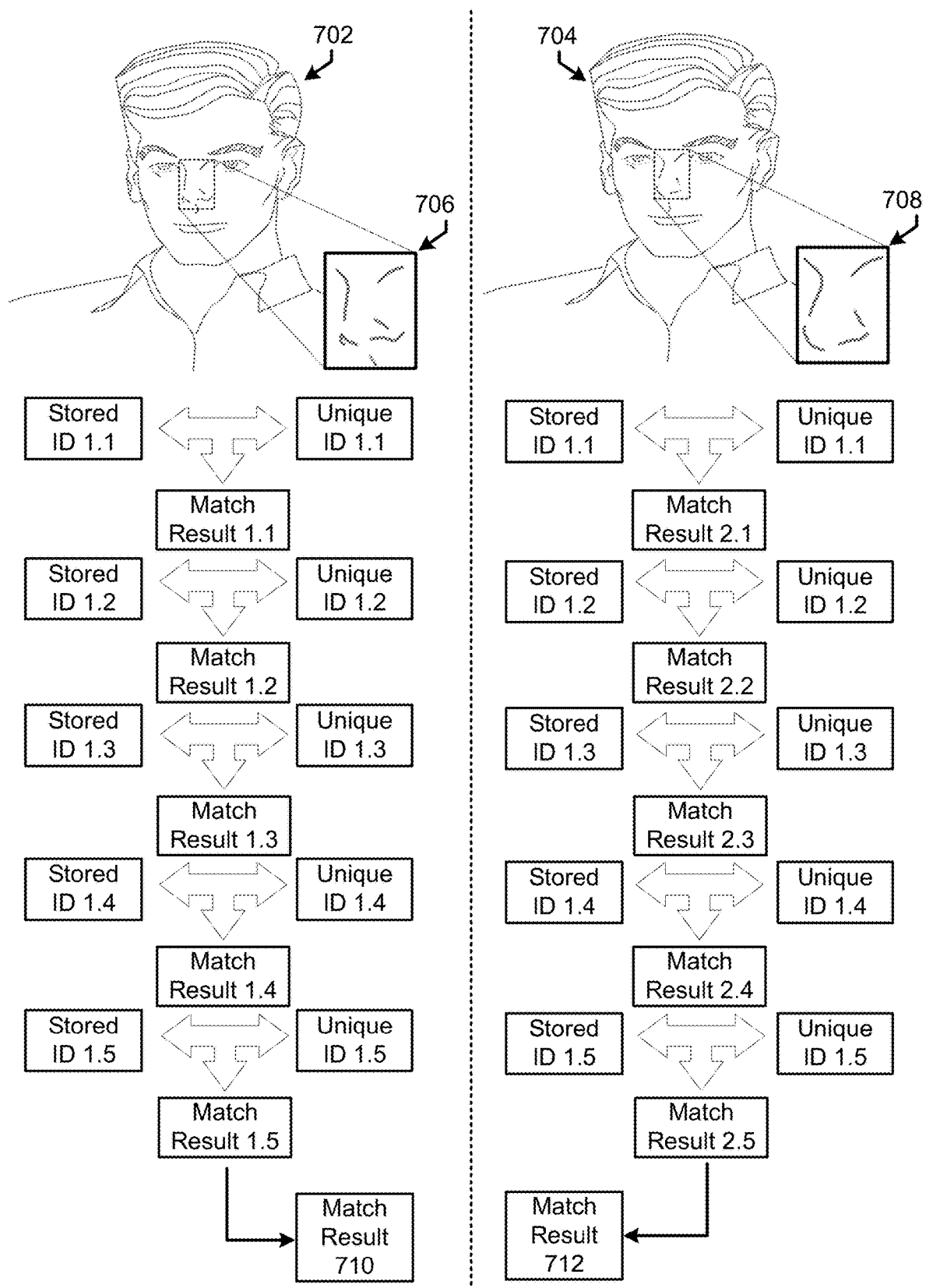
FIG. 7 depicts an illustrative example of a potential fraud attack conducted via an access request on a biometric authentication system implemented in accordance with embodiments described herein.

FIG. 7 depicts an illustrative example of a potential fraud attack conducted via an access request on a biometric authentication system implemented in accordance with embodiments described herein. In FIG. 7, a scenario similar to that described above with respect to FIG. 6 may be presented to the biometric authentication server described herein. Similar to the attack described above with respect to FIG. 6, in FIG. 7, two biometric samples 702 and 704 may be submitted via two separate access requests. In this example, consider that the access requests are conducted as part of a fraud attack in which the biometric samples 702 and 704 have both been procedurally generated. Assume that the attacker has generated the biometric samples as having all similar features with the exception of a small portion of the biometric sample. For example, region 706 of biometric samples 702 may be varied from region 708 of biometric samples 704.

In FIG. 7, the biometric authentication is performed in accordance with the process described with respect to FIG. 5 above, in that each of the biometric samples 702 and 704 are broken up into separate regions, for which regional match results may be determined. An aggregate likelihood value may then be determined from the regional likelihood values.

By way of illustrative example, consider a scenario as depicted in FIG. 7 in which the system is configured to separately determine match results for a number of regions for two separate biometric samples (702 and 704). Example match results for the biometric samples 702 and 704 are depicted for in Table 1 and Table 2 below respectively.

TABLE 1

| Match | Result |
| --- | --- |
| 1.1 | 0.95 |
| 1.2 | 0.83 |
| 1.3 | 0.56 |
| 1.4 | 0.78 |
| 1.5 | 0.93 |

TABLE 2

| Match | Result |
| --- | --- |
| 2.1 | 0.95 |
| 2.2 | 0.83 |
| 2.3 | 0.62 |
| 2.4 | 0.78 |
| 2.5 | 0.93 |

In this illustrative example, also consider that weights for generating an aggregate likelihood value for the biometric samples are as follows:

TABLE 3

| Region | Weight |
| --- | --- |
| 1 | 0.4 |
| 2 | 0.1 |
| 3 | 0.2 |
| 4 | 0.1 |
| 5 | 0.2 |

In this example, an aggregate likelihood value for each of the biometric samples may be determined as 0.4*R1+0.1*R2+0.2*R3+0.1*R4+0.2*R5 according to the weights in table 3 (where Rx refers to a match result for region x). Accordingly, in the illustrated example, biometric sample 702 may be assigned an aggregate match result 710 value of 0.839 (or 83.9%) and biometric sample 704 may be assigned an aggregate match result 712 value of 0.851 (or 85.1%). It should be noted that the aggregate values are the same as the corresponding match results values described in the example given in FIG. 6. Hence, the system may not be able to identify any pattern from the aggregate values, much less a pattern that indicates a potential attack.

In the example above, while the aggregate likelihood values for the two biometric samples may not be indicative of a potential fraud attack (as described with respect to FIG. 6 above), the likelihood value results from the regional matches may be. For example, the system, in order to detect a potential attack, may identify patterns in which a small subset of likelihood value results from the regional matches vary while the majority of the likelihood value results from the regional matches are substantially the same. In the example described above, regions 1, 2, 4, and 5 have identical scores while region 3 shows a variance (0.56 in 702 versus 0.62 in 704). This discrepancy may be used to identify a potential attack.

It should be noted that some portions of a biometric sample may impact more than one region. Hence, the system may identify a potential attack even when likelihood value results from multiple regions vary as long as some portion of likelihood value results remain the same. Additionally, it should be noted that the attack may not occur in sequential access requests. For example the attacker may perform an attack, wait a while, and then perform a second attack. Multiple other (and potentially legitimate) access requests may be made between attacks.

Figure 8:
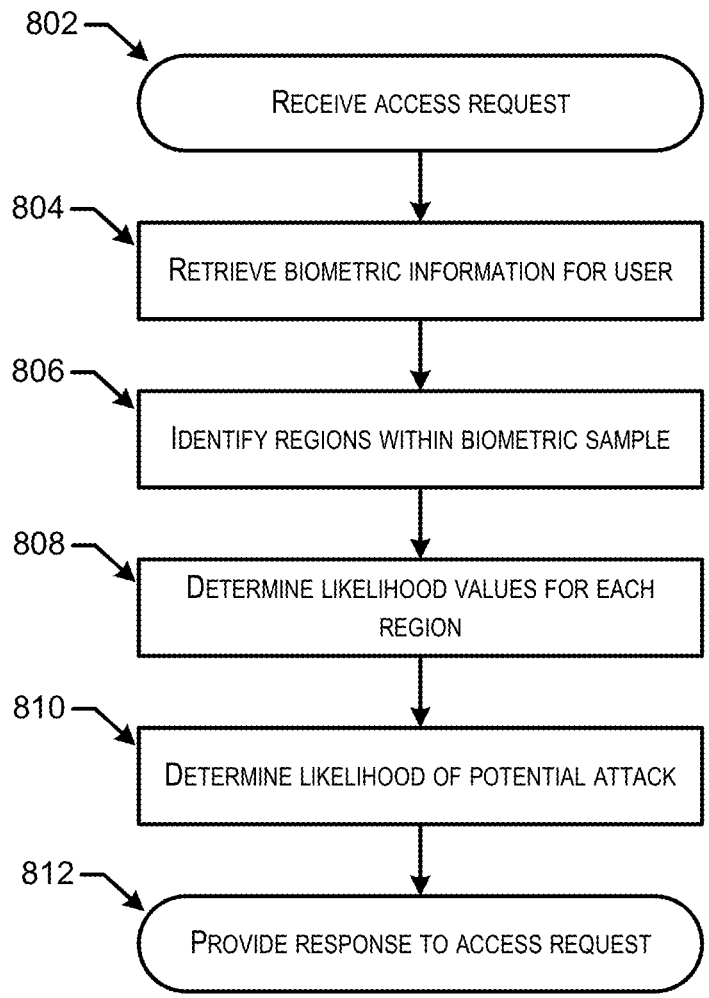
FIG. 8 depicts a flow diagram depicting an example process for identifying a potential fraud attack conducted via an access request in accordance with at least some embodiments.

FIG. 8 depicts a flow diagram depicting an example process for identifying a potential fraud attack conducted via an access request in accordance with at least some embodiments. In some embodiments, process 800 may be performed by a biometric authentication provider such as the biometric authentication provider 200 depicted in FIG. 2.

In some embodiments, process 800 may begin at 802, when an access request is received. The access request may include a biometric sample to be used to authenticate the access request. Additionally, an access request may include a user identifier that can be used to identify a user against which the access request is to be authenticated. In some embodiments, the user identifier may be at least one of a payment device identifier, an account number, a name, or a phone number.

At 804, process 800 may involve retrieving biometric information stored in association with a user. In some embodiments, the biometric information stored in association with a user may include biometric information obtained from the user during an enrollment process.

At 806, process 800 may involve identifying separate regions within the biometric sample. In some embodiments, each of the separate regions within the biometric sample are identified based on particular features extracted from the biometric sample which are associated with the region. For example, a region may be associated with one or more features that form a boundary of that region. In this example, the region may be identified as including the features within the one or more features.

At 808, process 800 may involve determining likelihood values for each of the separate regions. This may involve separately processing the plurality of regions within the biometric sample via separate biometric authentication modules. In some embodiments, each of the separate biometric authentication modules may be an artificial intelligence module trained on a particular region.

At 810, process 800 may involve determining a likelihood of a potential attack. In some embodiments, this may be determined based on the current and historical likelihood values for the various regions. For example, the process may involve identifying a majority of likelihood values which are substantially the same as the corresponding past likelihood values and identifying a minority of likelihood values which are different from the corresponding past likelihood values.

At 812, process 800 may involve providing a response to the access request. In some embodiments, upon determining that the likelihood of a potential attack is greater than a threshold value, the process may involve responding to the access request with an incorrect likelihood value. In some embodiments, upon determining that the likelihood of a potential attack is greater than a threshold value, the process may involve not providing a response to the access request.

In some embodiments, the process 800 may further comprise generating an aggregate likelihood value based on the likelihood values. The process may then involve determining whether the aggregate likelihood value is greater than a threshold value. Upon determining that the aggregate likelihood value is greater than the threshold value, the process 800 may involve providing a response to the access request that indicates the biometric sample is likely a match. In some embodiments, the likelihood that the access request is associated with a fraud attack may be determined if the aggregate likelihood value is less than the threshold value.

Embodiments of the disclosure provide for a number of advantages over conventional systems. For example, as illustrated throughout the disclosure, the system enables identification of, and the ability to thwart, fraud attacks which are unable to be detected using conventional biometric authentication systems. Additionally, where multiple portions of a biometric sample are processed in parallel, the system enables a potentially more detailed analysis of the biometric features without increasing the amount of time needed to perform that analysis. Accordingly, the system may provide for more accurate authentication without increasing the time that it takes to perform that authentication.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
providing, by a client device to a biometric authentication server, an access request pertaining to a user, the access request providing a biometric sample, wherein the biometric authentication server is configured to:
identify a plurality of regions within the biometric sample;
determine, for each of the plurality of regions within the biometric sample, a likelihood value that the region matches a corresponding region within biometric information stored in association with the user; and
determine, by the biometric authentication server based on the likelihood values and past likelihood values for each of the plurality of regions, a likelihood that the access request is associated with an attack by determining whether a majority of the regions of the plurality of regions of the biometric sample has a variance between past and current likelihood values within a threshold variance, and that a small number of the regions has a variance between past and current likelihood values that exceeds the threshold variance; and
receiving, by the client device from the biometric authentication server, a response to the access request indicative of the determination of the likelihood that the access request is associated with the attack.

2. The method of claim 1, wherein the access request includes a user identifier which is used to retrieve the biometric information stored in association with the user.

3. The method of claim 2, wherein the user identifier is at least one of a device identifier, an account number, a name, or a phone number.

4. The method of claim 1, wherein each of the plurality of regions within the biometric sample are identified based on particular features extracted from the biometric sample which are associated with each region.

5. The method of claim 4, wherein the biometric authentication server is further configured to determine whether the likelihood that the access request is associated with an attack is greater than a threshold value.

6. The method of claim 5, further comprising upon determining that the likelihood that the access request is associated with an attack is not greater than the threshold value, receiving, by the client device, a response to the access request that indicates that the biometric sample is likely a match.

7. The method of claim 1, wherein determining the likelihood value for each of the plurality of regions within the biometric sample comprises separately processing the plurality of regions within the biometric sample via separate biometric authentication modules.

8. The method of claim 7, wherein each of the separate biometric authentication modules comprise artificial intelligence module trained on a particular region.

9. The method of claim 1, wherein the response to the access request provides a rejection of the access request responsive to determining that the majority of the regions have the variance within the threshold variance and the small number of the regions have the variance exceeding the threshold variance.

10. A system comprising:
a client device comprising:
    a processor; and
    a memory including instructions that, when executed with the processor, cause the client device to, at least:
        provide, to a biometric authentication server, an access request pertaining to a user, the access request providing a biometric sample, wherein the biometric authentication server is configured to:
        identify a plurality of regions within the biometric sample;
        determine, for each of the plurality of regions within the biometric sample, a likelihood value that the region matches a corresponding region within biometric information stored in association with the user; and
        determine, by the biometric authentication server based on the likelihood values and past likelihood values for each of the plurality of regions, a likelihood that the access request is associated with an attack by determining that a majority of the regions of the plurality of regions of the biometric sample has a variance between past and current likelihood values within a threshold variance, and that a small number of the regions has a variance between past and current likelihood values that exceeds the threshold variance; and
        receive, from the biometric authentication server, a response to the access request indicative of the determination of the likelihood that the access request is associated with the attack; and
the biometric authentication server.

11. The system of claim 10, wherein the biometric authentication server is configured to determine that the likelihood that the access request is associated with an attack is greater than a predetermined threshold.

12. The system of claim 11, wherein the memory further includes instructions that cause the client device to, responsive to the biometric authentication server determining that the likelihood that the access request is associated with an attack is greater than the predetermined threshold, receive the response to the access request that includes an incorrect likelihood value.

13. The system of claim 10, wherein separate regions within the biometric sample are identified based on particular features extracted from the biometric sample which are associated with the region.

14. The system of claim 13, wherein a region may be associated with one or more boundaries of that region and wherein the region may be identified as including all of the features within the one or more boundaries.

15. The system of claim 10, wherein determining the likelihood that the access request is associated with an attack comprises identifying a pattern in the likelihood values and past likelihood values for each of the plurality of regions.

16. The system of claim 10, wherein the response to the access request provides a rejection of the access request responsive to determining that the majority of the regions have the variance within the threshold variance and the small number of the regions have the variance exceeding the threshold variance.

\* \* \* \* \*